(12) United States Patent
Bergerfurth et al.

(10) Patent No.: US 11,357,162 B2
(45) Date of Patent: Jun. 14, 2022

(54) FERTILIZER AND DEPTH GUIDE MEANS WITH TRAILING IN-LINE SEEDER

(71) Applicant: Lemken Gmbh & Co KG, Alpen (DE)

(72) Inventors: Dennis Bergerfurth, Rees (DE); Christian Gotzen, Viersen (DE); Martin Gebbeken, Alpen (DE)

(73) Assignee: LEMKEN GMBH & CO KG, Alpen (DE)

( * ) Notice: Subject to any disclaimer, the term of this patent is extended or adjusted under 35 U.S.C. 154(b) by 0 days.

(21) Appl. No.: 17/054,150

(22) PCT Filed: May 9, 2019

(86) PCT No.: PCT/DE2019/100416
§ 371 (c)(1),
(2) Date: Nov. 9, 2020

(87) PCT Pub. No.: WO2019/214781
PCT Pub. Date: Nov. 14, 2019

(65) Prior Publication Data
US 2021/0185891 A1 Jun. 24, 2021

(30) Foreign Application Priority Data
May 9, 2018 (DE) ............ 10 2018 111 147.9

(51) Int. Cl.
| *A01C 7/06* | (2006.01) |
| *A01C 5/06* | (2006.01) |
| *A01C 7/00* | (2006.01) |
| *A01C 7/20* | (2006.01) |

(52) U.S. Cl.
CPC ............. *A01C 7/06* (2013.01); *A01C 5/064* (2013.01); *A01C 7/006* (2013.01); *A01C 7/203* (2013.01)

(58) Field of Classification Search
CPC .......... A01C 7/006; A01C 7/06; A01C 7/203; A01C 5/064
See application file for complete search history.

(56) References Cited

U.S. PATENT DOCUMENTS

| 4,244,306 A * | 1/1981 | Peterson | A01C 7/06 111/187 |
| 4,413,685 A * | 11/1983 | Gremelspacher | A01B 63/22 111/14 |
| 5,970,891 A * | 10/1999 | Schlagel | A01B 35/28 111/135 |
| 7,004,090 B2 * | 2/2006 | Swanson | A01C 23/02 111/119 |
| 8,047,301 B2 * | 11/2011 | Friggstad | A01C 5/064 172/574 |
| 9,693,497 B2 * | 7/2017 | Schaffert | A01C 5/066 |
| 9,943,028 B2 * | 4/2018 | Berendsen | A01B 15/18 |
| 10,327,376 B2 * | 6/2019 | Gebbeken | A01C 7/044 |
| 10,362,724 B2 * | 7/2019 | Berendsen | A01C 5/068 |

(Continued)

FOREIGN PATENT DOCUMENTS

DE 102013111355 A1 4/2015

*Primary Examiner* — Alicia Torres
(74) *Attorney, Agent, or Firm* — The Watson IP Group, PLC; Jovan N. Jovanovic

(57) ABSTRACT

A seed drill having a frame, to which at least one seeding coulter and a fertiliser coulter arranged upstream of the seeding coulter in a working direction are connected. The seeding coulter and the fertiliser coulter are each assigned depth control.

22 Claims, 5 Drawing Sheets

(56) References Cited

U.S. PATENT DOCUMENTS

Figure 1:
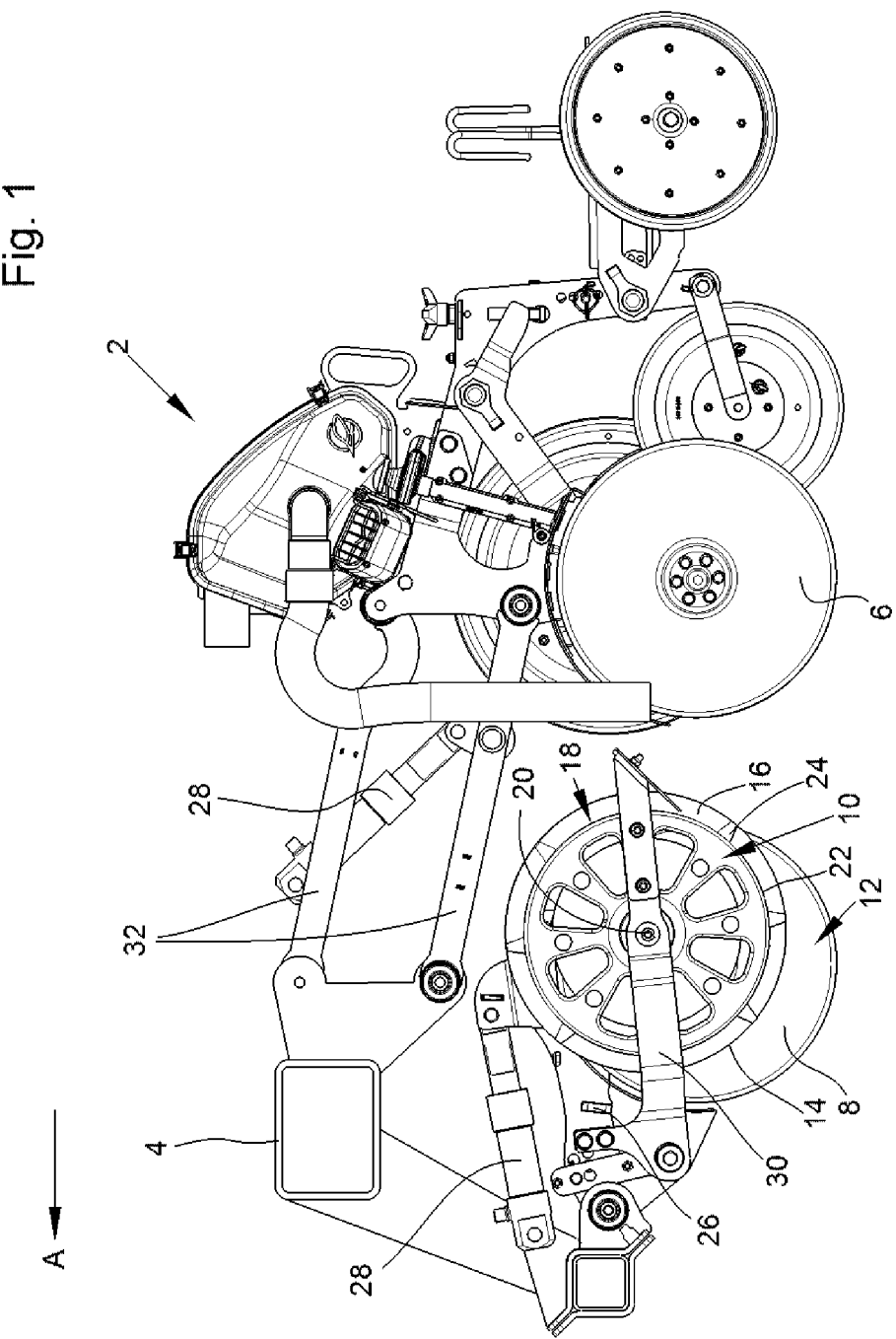

2014/0230704 A1  8/2014 Zimmerman
2017/0215334 A1  8/2017 Dienst et al.
2017/0318727 A1  11/2017 Roberge et al.

* cited by examiner

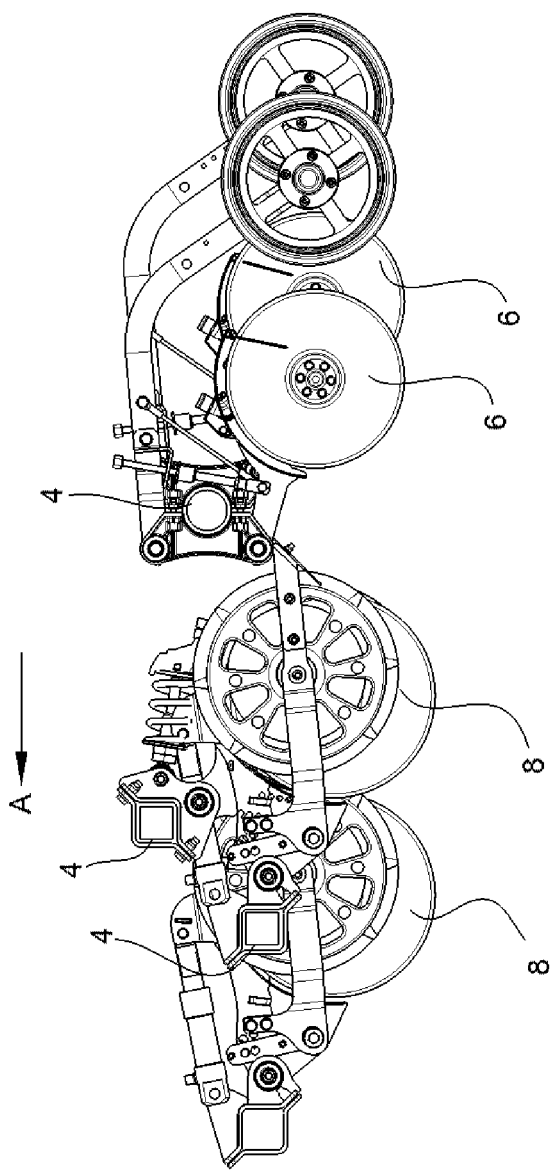

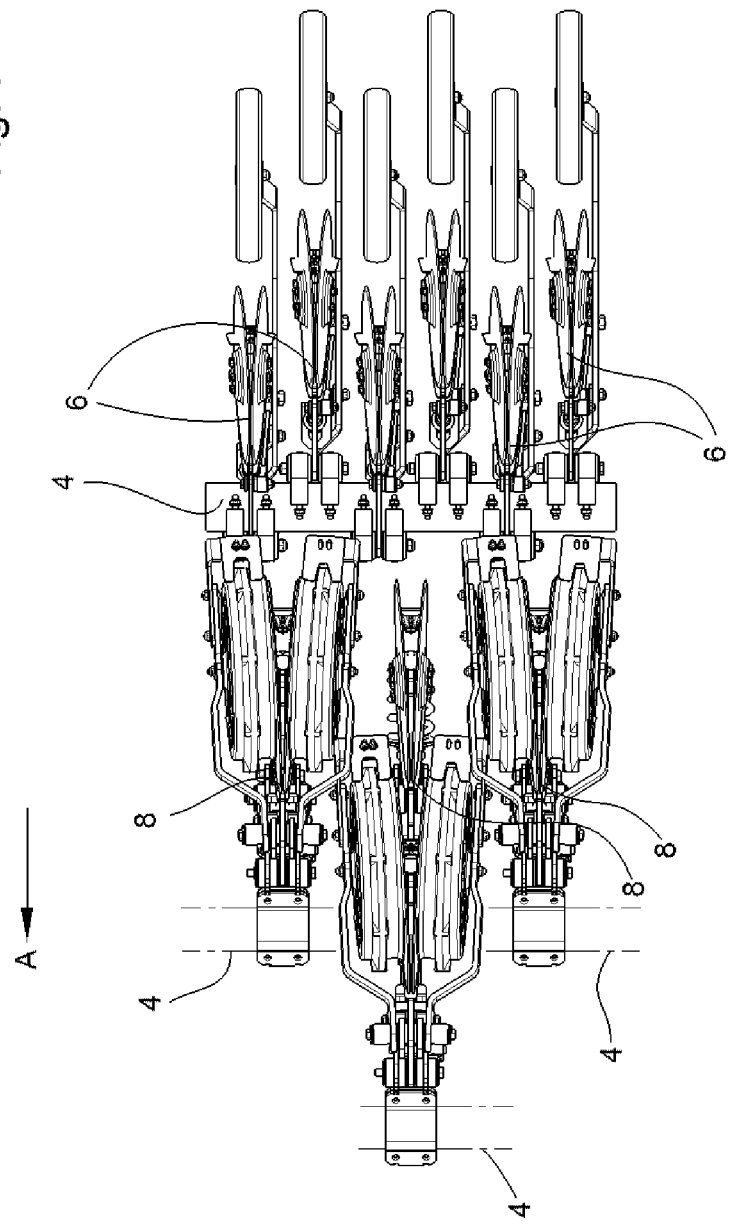

FERTILIZER AND DEPTH GUIDE MEANS WITH TRAILING IN-LINE SEEDER

The present invention relates to a seed drill having frame, with which at least one seeding coulter and a fertiliser coulter arranged in front of the seeding coulter in a working direction are connected, wherein the seeding coulter and the fertiliser coulter are each assigned a depth control means.

A generic seed drill is known from the publication DE 10 2013 111 357 B4. There, a combined arrangement of fertiliser coulters and seeding coulters is shown, with which in one pass fertiliser and seeds can be introduced into the ground.

The long design and the heavy weight of the assembly proved to be disadvantageous. The depth control of the fertiliser coulter is not optimal either.

The object of the present invention is to improve the function of the seed drill.

The object is solved for a generic seed drill in which at least on a side of the fertiliser coulter a depth control means is arranged laterally next to the fertiliser coulter so that seen from a direction transversely to the working direction at least half of its enveloping surface overlaps the enveloping surface of the fertiliser coulter and the depth control means comprises a row performing and re-compacting means entering the ground, which seen transversely to the working direction is arranged offset to the fertiliser coulter so that in its track the following seeding coulter cuts into the ground and forms the seed furrow.

In that at least half of the enveloping surface of the depth control means overlaps the enveloping surface of the fertiliser coulter, an overall shortened design is achieved. By way of this, the weight of the assembly for the fertiliser coulter in total is reduced. In particular however the depth control of the fertiliser coulter is also improved in that the distance between the fertiliser coulter and the associated depth control means seen in the working direction is reduced. Changes in the ground contour, which the depth control means follows, are transmitted out or at least with only a very small time delay to the fertiliser coulter because of the reduced distance of the depth control means from the fertiliser coulter seen in the working direction. Because of this, the depth placement of the fertiliser keeps to an exact desired dimension relative to the ground surface even in the case of ground irregularities.

When an overlapping of the enveloping surface of the fertiliser coulter with the overlapping of the enveloping surface of the depth control means by more than half is mentioned here, the quantity indicated refers to the normal operating states with which the seed drill is operated. Extraordinary pivot positions of the depth control means and/or of the fertiliser coulter, which although being technically possible have little or no significance in practical use, can be left out of consideration in implementing the inventive teaching.

Even by the arrangement of the depth control means on only one side of a fertiliser coulter the ripped open seed furrow can be again preformed and re-compacted so that a seed furrow that can be favourably optimised is formed by the following seeding coulter. The depth control means ensures directly during the fertiliser placement that the ground that is initially ripped open and loose for the fertiliser placement is again well re-compacted for the following seeds so that the subsequent seed placement by the seeding coulter can take place in an optimally prepared ground.

The enveloping surface of the depth control means can overlap the enveloping surface of the fertiliser coulter even by more than half or even with its entire enveloping surface. Here, the enveloping surface of the fertiliser coulter corresponds to the surface of the disc coulter, which is a part of the fertiliser coulter. The fertiliser coulter can be designed as single or double disc coulter. The greater the overlap is, the more directly can the fertiliser coulter be adjusted in its working height to changes of the ground contour by the depth control means.

The optimal ground pre-compaction in the seed furrow following the introduction of the fertiliser is important from a plant cultivation point of view. The capillary action of the ground, via which moisture from deeper ground horizons is brought up to the seeds would not function without an adequate ground pre-compaction, since the capillary action breaks down in a soil that is layered too loosely. In that the ground pre-compaction is brought near the fertiliser dispensed by the fertiliser coulter it is not only the moisture but also the nutrients from the fertiliser that can be favourably brought up to the seeds by way of the moisture rising up in the ground because of the restored capillary action.

At higher travelling speeds, the proposed arrangement of the depth control means results in that less soil is splattered away from the fertiliser coulter and the depth control means and thereby a more level ground surface and a straight seed horizon is created. Since the fertiliser coulter and the depth control means arranged laterally of the same overlap one another by at least half in the lateral direction, not so much soil can be flung away laterally in the overlap region any longer.

The depth control means comprises a row pre-forming and re-compaction means entering the ground which, seen transversely to the working direction, is arranged offset to the fertiliser coulter so that the following seeding coulter cuts into the ground in its track forming the seed furrow. With the row pre-forming and re-compaction means entering the ground the depth control means is functionally not restricted only to the ground support of the fertiliser coulter but it is additionally employed to pre-form and pre-compact the ground in the region of the seed furrow subsequently complemented by the seeding coulter for placing the seeds. In that the row pre-forming and re-compaction means and the following seeding coulter are arranged track-accurately in space following one another, the re-compaction and re-forming is restricted to identical ground regions so that the working of ground regions which are insignificant for seed placement is avoided.

By combining the features, according to which the enveloping surfaces of the depth control means and of the fertiliser coulter overlap at least by half and the depth control means assigned to the fertiliser coulter is spatially arranged so that it pre-compacts the seed bed for the following seeding coulter, a very compact and effective arrangement is obtained, with which an improved seed output is combined with an optimal height control of the fertiliser coulter.

According to a configuration of the invention, a depth control means is arranged on both sides of the fertiliser coulter. By way of the depth control means arranged on both sides of the fertiliser coulter, the preparation of the ground for the following seed placement is even more even in the transverse direction than is possible with only one depth control means assigned to the seeding coulter on one side. The re-compaction of the ground ripped open by the seeding coulter and the preparation of the seed furrow for the following seeding coulter can thereby be effected equally well on both sides of the seeding coulter.

According to a configuration of the invention, the depth control means assigned to the fertiliser coulter is or are one wheel or multiple wheels. When using wheels as depth control means the friction resistance from the ground contact of the depth control means falls away almost entirely. In addition, the wear of the depth control means is reduced through the rolling of the wheels over the ground. In addition, wheels can better roll over possible obstacles in or on the ground as a result of which the risk of damage to the fertiliser coulter and the depth control means is reduced. Moreover, the rolling wheels bring about a good re-compaction of the ground.

According to a configuration of the invention, the wheels are a spoke wheel or a solid wheel. In the case of a solid wheel, the lateral entry of soil or foreign bodies in the space between the fertiliser coulter and the wheel body is reduced. This is advantageous in certain ground conditions. In other ground conditions it can be advantageous however when soil or foreign bodies can more easily fall out of the intermediate space. This is possible for example with spoke wheels or with wheels having recesses in the wheel dish.

According to a configuration of the invention, a circumferential ring as row pre-forming and re-compaction means is formed on the outer circumference of the wheels in each case, which projects towards the outside relative to a revolving ground contact area of the respective wheel that is adjacent to the ring. By way of the revolving ring, the pre-compaction of the ground is increased in the pressure direction of the ring and introduced deeper into the ground. While the ground contact area rolls more or less exactly on the ground surface, the outer circumferential contour of the ring enters the ground. Thus, the ring makes possible a target compaction of the ground as far down as into the region of the fertiliser coulter, since such a ring with a suitable pressure application can also dip into the ground as far down as below the ground surface and thereby bring the pre-compaction also into deeper ground layers. On the other hand, the adjacent circumferential ground contact areas can roll on the ground surface wherein they enter the ground less deep or in fact can only roll on the ground surface and because of this exactly copy the ground contour. By way of the ring, the compaction of the ground—depending on the cross-sectional shape of the ring and of the ground contact areas—can thus be brought about in multiple steps or continuously as far as into deeper regions of the ground. In the process it is possible to configure the depth and width effect of the ground pre-compaction by a suitably configuration of the cross-sectional shape of the ring, of the circumferential ground contact area and of the surface portions of the ring and of the adjacent circumferential ground contact area on the wheels in a desired manner. Through the cross-sectional shape of the ring, the flank shape of the seed furrow formed in the region of the fertiliser coulter can be additionally configured suitably.

According to a configuration of the invention, the axes of rotation of the wheels are set obliquely to the working direction so that in working direction a sweepback of the wheels materialises. Through the sweepback of the wheels it is possible to form a seed furrow for the following seeding coulter out of the ground and also pre-compact the same. Through the sweepback of the wheels and their rotary motion during the forward travel, the ground, which during the forward travel of the seed drill strikes against the wheel body, is pushed aside and thus out of the active region of the fertiliser coulter and of the seeding coulter in a direction that is transverse to the working direction. In particular when the wheel is provided with a ring, the flank of the ring standing in working direction, acts as a kind of shield which, following the sweeping contour, obliquely pushes the ground material collected by it to the side. With such a pre-forming of the seed furrow, the seeding coulter during its forming of the seed furrow is partially relieved and can therefore more precisely place the seeds in an optimally pre-compacted and pre-formed seed furrow.

According to a configuration of the invention, the sitting angle of the wheels relative to the working direction corresponds to the setting angle at which the discs of the seeding coulter are set relative to the working direction. With this formation of the setting angle it is particularly favourably possible to create a shape-retaining seed furrow in which the seeds can be optimally placed. With the double formation of the seed furrow, stable furrow flanks are obtained without during the formation and pre-compaction of the flanks of the seed furrow ground material can slip back into the bottom of the seed furrow. This results in optimal conditions for the seed placement.

According to a configuration of the invention, the axes of rotation of the wheels are set obliquely to the vertical direction, wherein the setting angle of the wheels in the vertical direction preferably corresponds to the setting angle at which the discs of the seeding coulter are set relative to the vertical direction. This configuration results in that the contact point of the wheels with the ground surface is at approximately seven to eight o'clock of the wheel. The oblique position of the wheels also in vertical direction results in that the wheels in the contact region can easily push ground material obliquely to the side. The lateral flanks of the seed furrow are provided with an oblique slope because of this, which in the process is favourably pre-compacted in order to form a perfect seed furrow. Through the oblique position of the wheels in the vertical direction, the wheels can more easily enter the ground and in the process more easily discharge ground material aside. Through the oblique position, conveying to the side is supported, wherein the soil material is not thrown up unnecessarily high. The laterally discharged ground material has less tendency of slipping back into the seed furrow.

According to a configuration of the invention, the depth control means assigned to the fertiliser coulter comprises or comprise a wiping surface on one or both flank sides that is set obliquely to the forward travelling direction. In particular the lateral flanks of the depth control means are possible as wiping surface here, which point in the working direction. When as depth control means a wheel is used, this can be the flanks of the wheel inclined in the working direction or a circumferential ring formed on the wheel. The wiping surfaces serve for initially cutting the upper ground horizon, loosen and laterally discharge the ground material. In order to fulfil this objective as best as possible, the surface of the wiping surface can be suitably shaped. Accordingly, the wiping surfaces can be bevelled relative to the rotational plane of a wheel, have edges that are formed sharp in the end region and are produced from a material which has a particular toughness in the event of foreign body contacts, such as for example a particularly hardened steel or even elastic components, capable of removing force peaks.

According to a configuration of the invention, the depth control means assigned to the fertiliser coulter have projections in the ground contact region, which project over the surrounding surfaces. The projections can be wedges in triangular or trapezium shape which beyond the surrounding surface enter deeper into the ground upon a ground contact. Through the greater interaction with the ground accompanied by this, the projections can serve as drive for the rotary motion of the wheels. The projections can extend over the complete or partial depth of the rings. The projections can be arranged distributed at regular or irregular distances over the outer circumference of the wheels. The projections can also differ from one another in their shape, height and their material.

According to a configuration of the invention, the depth control means have a symmetrical cross-sectional shape. Through the asymmetrical cross-sectional shape of the depth control means, these can be optimised for the function of forming the furrow of the seed bed. In particular rings, which are formed as depth control means on wheels, can have an asymmetrical cross-sectional shape. Here, the side of the depth control means pointing in the working direction is configured so that the ground material is optimally ripped, loosened and discharged to the side. On the side of the depth control means facing the fertiliser coulter, the seed furrow has to be adequately opened and loose ground material cleared aside. Depending on the type and number of the coulter discs on the seeding coulter employed and their spatial arrangement on the frame, symmetrical cross-sectional shapes of one or both rings can also be practical however.

According to a configuration of the invention, at least one edge of the flanks of the depth control means facing the fertiliser coulter reaching deepest into the ground in the working position and at least one of the edges of the discs of the seeding coulter reaching deepest into the ground are arranged in a line which runs parallel to the working direction. The formation of the seed furrow by the depth control means on the fertiliser coulter has to be procedurally in accordance with the optimisation of the seed furrow by the discs of the seeding coulter, even when the same is a double disc coulter, in order to ensure the optimum placement of the seeds in the ground. In this way, the seed furrow is substantially pre-formed by the depth control means of the fertiliser coulter and the double discs of the seeding coulter merely have to perform the remaining formation. Here, an optimal working result is achievable when the edges of the flanks of the depth control means facing the fertiliser coulter and reaching deepest into the ground and the edges of the discs of the seeding coulter reaching deepest into the ground are arranged in a line in the proposed manner.

According to a configuration of the invention, the depth control means are entirely or partially produced from a polymer or elastomer material. Accordingly, the running surfaces can be provided for example with a polymer or elastomer lining while the ring and/or projections formed on the ring have a metallic surface.

According to a configuration of the invention, the depth control means alone or jointly with the fertiliser coulter are pivot-moveably mounted relative to the frame. The pivot-moveable mounting makes possible a continuous individual height adjustment of the depth control means following the ground contour, namely in a region of low height deflections preferably only of the depth control means and in a greater region of height deflections also with the fertiliser coulter than connected with the same during the work. Because of this, the position of the frame is no longer solely decisive for the individual height position of the fertiliser coulter but in particular or only the height control by the depth control means. Because of this, the fertiliser can be introduced into the ground at a distance from the ground surface and thus also from the seeds introduced in the following that remains at least approximately the same.

According to a configuration of the invention, the pivot movements of the depth control means are restricted towards the top and/or bottom by a mechanical stop. The stop or stops make possible a height movement of the depth control means in a frame bounded by the stop or stops, without the fertiliser coulter is immediately influenced in its height position in the process, as a result of which the fertiliser coulter runs very smoothly in the fertilising track. Through the mechanical stop, excessive upward or downward movements of the fertiliser coulter are avoided which in turn negatively affect the placement quality. Only when a height deviation exceeds the margins granted by the stops is the height deflection transmitted to the fertiliser coulter.

According to a configuration of the invention, the mechanical stop is designed so as to be adjustable in height. Depending on the ground condition and according to the type of the fertiliser and of the seeds which are output with the seed drill, it can be necessary to adjust the height position of the stop to the specific conditions in order to achieve an optimal working result. This is possible with the height-adjustable stop.

According to a configuration of the invention, the depth control means are held on the ground in the working position by way of an energy store. Possible energy stores are passive systems such as for example a mechanical or elastomer spring, which are for example supported against the frame and upon a spring compression movement of the depth control means absorbs and stores energy and again releases the same when the depth control means, again driven by the stored energy, rebounds. However, hydraulic, pneumatic or electrical systems can also be used as energy stores which according to a configuration can be actively controlled. Here, hydraulic cylinders or pneumatic actuation systems are possible which are subjected to energy from a pressure accumulator. A pressure can also be exerted on the depth control means via electric motors. The control takes place against the weight of the frame when the frame of the seat drill is floatingly mounted. When the frame is held in a given fixed working position on the tractor, the control also takes place against the weight of the tractor. With changing heavy ground conditions, the active support pressure and the height position of the fertiliser coulter resulting from this can be continuously adjusted to suite requirements during the running application of the fertiliser.

According to a configuration of the invention, the forces from the energy store acting on the depth control means are adjustable by way of an adjusting device. With the adjusting device, the coulter pressure can be adjusted, which acts on the fertiliser coulter during the running operation. With the adjusting device, a preload can be adjusted to a desired value manually-mechanically or via an operating device on the seat drill or via a remote control, for example from the tractor. However, the adjusting device, sensor-controlled, can also hold a certain coulter pressure and/or a certain height position of the depth control means and thus of the fertiliser coulter in an automated manner by way of a suitable software and an actuation system controlled by the software. By way of the adjusting device, the active forces from the energy store can be adjusted to the respective ground conditions and the desired placement depth of the fertiliser.

According to a configuration of the invention, the adjusting device comprises an evaluation electronic system which is connected to a sensor system, which measures the current height positions of the fertiliser coulter and/or forces acting on the fertiliser coulter, determines correcting variables for adjusting the adjusting device from the transmitted sensor data by means of a suitable software, and which is connected to actuators of the adjusting device, to which the evaluation electronic system transmits the determined correcting variables as controlling quantities. An automated controlled operation is possible with the evaluation electronic system.

According to a configuration of the invention, the seeding coulter connected to a depth control means is held on the ground in the working position via an energy store, and the energy store holding the seeding coulter on the ground is functionally connected to the energy store which holds the fertiliser coulter on the ground.

The functional connection can be established in different ways.

Thus it is possible to connect the energy stores, when designed as hydraulic cylinders coupled in parallel to a pressure accumulator. With such a connection, the constant pressure generated out of the pressure accumulator is always transmitted to the energy store which currently receives a lesser counter pressure, so that the fertiliser coulter or seeding coulter connected to the same is pushed down and extended in the process. The pressure equalisation that takes place in the process can result in that the other fertiliser coulter or seeding coulter is correspondingly retracted in the process until a complete pressure equilibrium has taken place. The parallel interconnection of the hydraulic cylinders against a pressure accumulator acts like a pressure scale which distributes the applied pressure to both energy stores continuously variably depending on the current application situation. When the counter pressure on the pressure accumulator from an energy store increases this results in that the corresponding fertiliser or seeding coulter and the associated energy store is retracted and if applicable the other fertiliser or seeding coulter extended or the pressure in the pressure accumulator rises. In the case of measured pressure increases or pressure drops in the pressure accumulator, the pressure there can also be increased or lowered which has a direct effect on the pressure acting on the connected energy stores of the fertiliser and seeding coulter and directly influences the penetration behaviour into the ground of these.

A rapid pressure increase in the pressure accumulator, which originates from a spring compression movement of the fertiliser coulter and cannot be offset by a direct extension movement of the seeding coulter, indicates a possible contact with an obstacle which can also occur with the seeding coulter and cause a collision damage there. In order to diminish the damage risk, the pressure increase can be utilised in order to suddenly reduce the pressure preload for the fertiliser and the seeding coulter in order to avoid or at least reduce damage to both components. The rapid pressure reduction in the pressure accumulator corresponds to a type of overload protection which protects the fertiliser and the seeding coulter against possible damage or at least reduces these.

It is likewise possible in the same way to simultaneously increase the pressure in the pressure accumulator for the fertiliser and the seeding coulter when it is recognised for example that these elements do not enter deep enough in the ground because the same is too hard or too dry. This condition can be detected by a suitable sensor system or a suitable adjustment is made by an operator. The operation of the seed drill is simplified when suitable actuation specifications for the fertiliser and the seeding coulter can be jointly given.

Instead of energy stores in the shape of hydraulically actuated systems, corresponding functions can obviously be realised also by other energetic systems, such as pneumatic or electrical systems with the corresponding associated system components. A mixed use of such systems is also possible such as for example the combined use of hydraulic cylinders with a hydraulic system with electrically driven servo motors from the electrical system, in each case for fulfilling suitable part objectives.

According to a configuration of the invention, the energy stores for the fertiliser coulter and the seeding coulter are jointly adjustable. The joint adjustment can serve for example for implementing part-surface-specific specifications. Accordingly, the energy stores can be jointly actuated in order to lift the fertiliser and the seeding coulter for the associated seed furrow at the same time or in quick succession in order to avoid sowing again already seeded surfaces at the headland or return furrow. A possible joint actuation is also the joint retraction or extension of double-acting hydraulic cylinders for the fertiliser and the seeding coulter when the seed drill is folded up or folded out for the road transport. By way of the joint actuation option of the energy stores, the operation and handling of the seed drill is significantly simplified.

According to a configuration of the invention, one or more fertiliser coulters and/or seeding coulters are part-surface-specifically liftable by the respective energy store. By way of the part-surface-specific lifting, overlaps of placement tracks in the sowing can be avoided. By utilising the existing energy stores for the lifting, additional lifting technology can be omitted. The respective energy stores are addressed preferably by a control if required in order to lift or again lower the fertiliser and/or seeding coulters concerned.

According to a configuration of the invention, one or more fertiliser coulters and/or seeding coulters are retracted by the associated energy stores in the transport position of the seed drill. The energy stores can also be utilised in order to spatially move the fertiliser and/or seeding coulters during the reduction of the working width of the seed drill to the transport width so that a smaller transport width of the seed drill materialises.

Further features of the invention are obtained from the claims, the figures and the subject description. All features and feature combinations mentioned above in the description and the features and feature combinations mentioned in the following figure description and/or shown in the figures alone cannot only be used in the respective combination stated but also in other combinations or by themselves.

The invention is now explained in more detail by way of a preferred exemplary embodiment and making reference to the attached drawings.

It shows:

FIG. 1: a seed drill with fertiliser coulter and seeding coulter in a lateral view, FIG. 2: a fertiliser coulter in an enlarged lateral view, FIG. 3: a view of a fertiliser coulter from below, FIG. 4: a view of the fertiliser coulter shown in FIG. 2 with a spoke wheel, FIG. 5: a view from below of a combination of a fertiliser coulter with a seeding coulter, FIG. 6: a configuration of the seed drill in a lateral view, in which the fertiliser coulters and seeding coulters are each arranged laterally offset one behind the other, and FIG. 7: the arrangement shown in FIG. 6 from a view from below.

In FIG. 1, a seed drill 2 is shown, to the frame of which a seeding coulter 6 and a fertiliser coulter 8 are attached. The seed drill 2 is moved over the field in working direction A. In the process, the fertiliser coulter 8 initially places a fertiliser in the ground. The following seeding coulter 6 then places the seeds on top and/or next to it. The combination of the fertiliser coulter 8 with the seeding coulter 6 thus rips open a seed furrow while travelling over the field, shapes the same, introduces the fertiliser in the same, again compacts the ground, then places the seeds into the seed furrow, closes the seed furrow and again compresses the ground in the region of the closed seed furrow.

In order for even the fertiliser coulter 8 to be able to introduce the fertiliser adequately deeply and exactly into the ground, the fertiliser coulter 8 in the exemplary embodiment is equipped with double discs, which rip open the ground in their active region and create a furrow in which the fertiliser can be placed. The double discs of the fertiliser coulter 8 have an enveloping surface 12 in the lateral view which is defined by the circular circumference of the disc coulter in the lateral view.

In the exemplary embodiment, the depth control means is designed as wheel 14. The wheel 14 has an enveloping surface 10 which is defined by the circumference of the wheel 14.

In the lateral view it is clearly noticeable that the enveloping surface 10 of the wheel 14 overlaps the enveloping surface 12 of the fertiliser coulter 8 in the shown pivot position by more than half—in the exemplary embodiment by approximately 80%.

In that seen transversely to the working direction A the wheel 14 as an exemplary embodiment of a depth control means and the fertiliser coulter 8 are arranged exactly or at least approximately next to one another, changes in height in the terrain contour have a direct effect on the height control of the fertiliser coulter 8 via the depth control means. When the ground contour rises, the depth control means moves its height position upwards and in the process takes the fertiliser coulter 8 upwards with it by force via a mechanical coupling. Similarly, the depth control means together with the fertiliser coulter 8 moves downwards when the ground drops. Through the simultaneous movement of the depth control means and of the fertiliser coulter 8 along the ground contour, the fertiliser is always placed at a depth that at least approximately stays the same relative to the ground surface. Substantial fluctuations in the height placement of the fertiliser are thus avoided.

In the exemplary embodiment, the wheel 14 is provided with spokes. Obviously, the wheel 14 can also be designed as a closed wheel body.

The wheel 14 comprises a ground contact area 18, with which the wheel 14 supports itself on the ground and with which the wheel 14 follows the ground contour. A part of the outer circumference of the wheel 14 however is also formed by a ring 16, which projects in the radial direction over the ground contact area 18. The ring 16 serves the purpose of entering the ground. The ring 16 is to help performing the seed furrow and re-compacting the ground in the region of the fertiliser placement. In this way, the wheel 14 is involved as depth control means in the formation, shaping and compaction of the seed furrow.

In the exemplary embodiment, a wheel 14 as depth control means is located on both sides of the fertiliser coulter 8.

During the forward travel of the seed drill 2, the wheel 14 rotates about the axis of rotation 20 in the direction of rotation R. Since the wheel 14 itself is not actively driven but at the same time is to roll over the ground surface so as not to smear the ground material in the region of the seed furrow it is advantageous when projections 24 are located on the wiping surfaces 22 of the ring 16. The projections 24 form a kind of wedges which engage with the ground material and via which surfaces pointing in the working direction A build up a pressure while rolling over the ground by way of which the wheel 14 is set in rotary motion. In the lateral view, the projections 24 can have a triangular, trapezium, rib or other shape via which towards the ground during the forward movement of the seed drill 2 over the ground an areal pressure on the wheel 14 can be built up.

The projections 24 also have an advantageous effect on the formation of the seed furrow. In that the projections 24 break through the lateral flanks of the seed furrow transversely to the working direction A, the projections 24 form structures in the flank region of the seed furrow into which the roots of the seeded plants can favourably grow and from there break through the lateral flanks of the seed furrow. Rapid rooting and the growth of the seeds is promoted by the projections 24 in this way.

In the exemplary embodiment, the fertiliser coulter 8 is held on a pivot arm 30 whose downward movement is limited by the stop 26. The pivot movement is also limited upwards namely by the axis of rotation of the fertiliser coulter 8. The fertiliser coulter 8 is pivot-moveably held on the frame 4 by a hydraulic cylinder, with which the fertiliser coulter 8 can be held against the frame 4 pressed into the ground. The hydraulic cylinder is an example of an energy store 28 which presses the fertiliser coulter 8 into the ground. The hydraulic cylinder as energy store 28 can be actively controlled in that hydraulic liquid, controlled by an adjusting device, is fed into or discharged from the hydraulic cylinder. However it is also possible to let the hydraulic cylinder work passively against a pressure accumulator, which depending on design, allows evasive movements of the fertiliser coulter 8 against obstacles in the ground via the hydraulic cylinder. The preload of the energy store 28 during the course of the work of the seed drill 2 can also vary in order to adjust the pressure with which the fertiliser coulter 8 is pressed onto the ground, to different ground conditions.

In the exemplary embodiment, the seeding coulter 6 is also pivot-moveably connected to the frame 4. In the exemplary embodiment, the seeding coulter 6 is connected to the frame by way of a parallelogram link 32. Here, in order to also press the seeding coulter 6 onto the ground, an energy store 28 is provided, which in the exemplary embodiment is designed as hydraulic cylinder. The above explanations regarding the hydraulic cylinder which holds the fertiliser coulter 8 pressed to the ground, correspondingly apply to this hydraulic cylinder.

Figure 2:
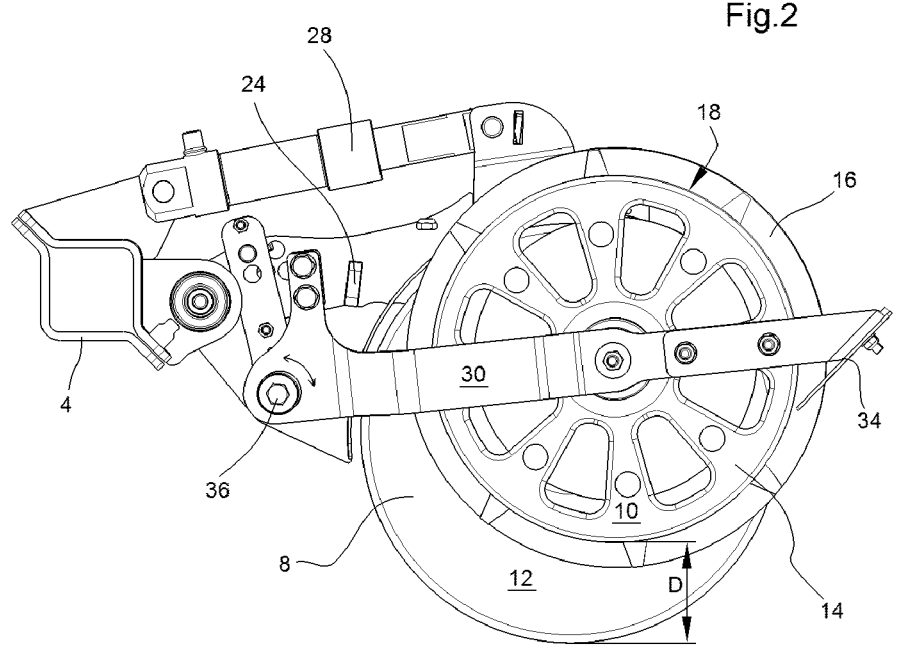

In FIG. 2, the fertiliser coulter 8 is shown in an enlarged view. In this view, the pivot arm 30 is situated in a pivot position maximally pivoted upwards. Even in this pivot position, more than half of the enveloping surface 10 is situated in the region of the enveloping surface 12 of the fertiliser coulter 8. On the end of the pivot arm 30 a wiper 34 is located with which ground material adhering to the ground contact areas 18 and the surfaces of the ring 16 is wiped off during the rotary movement of the wheel 14. In this exemplary embodiment, there are no projections 24 located on the flanks of the ring 16. Furthermore, no spokes are formed in the wheel 14 either, but it is closed in the surface.

From FIG. 2 it is noticeable that the pivot arm 30, upon pivoting about the axis of rotation 36, changes the distance of the ground contact area 18 of the wheel 14 to the lowest point of the coulter disc of the fertiliser coulter 8. The distance between the ground contact area 18 at the lowest point of the coulter disc of the fertiliser coulter 8 is drawn in as distance D in FIG. 2. Here, the distance D is to mean the depth to which a fertiliser is placed into the ground with the fertiliser coulter 8. During the course of pivot movements of the pivot arm 30 the depth dimension D can vary within the scope of the stops 24. However, when the pivot arm 30 strikes the stops 24 the wheels 14 work against the energy store 28 and in the process, depending on the pressure application of the energy store 28, trigger a movement of the fertiliser coulter 8 relative to the frame 4 or the fertiliser coulter 8 is pressed deeper into the ground by the pressure of the energy store.

Figure 3:
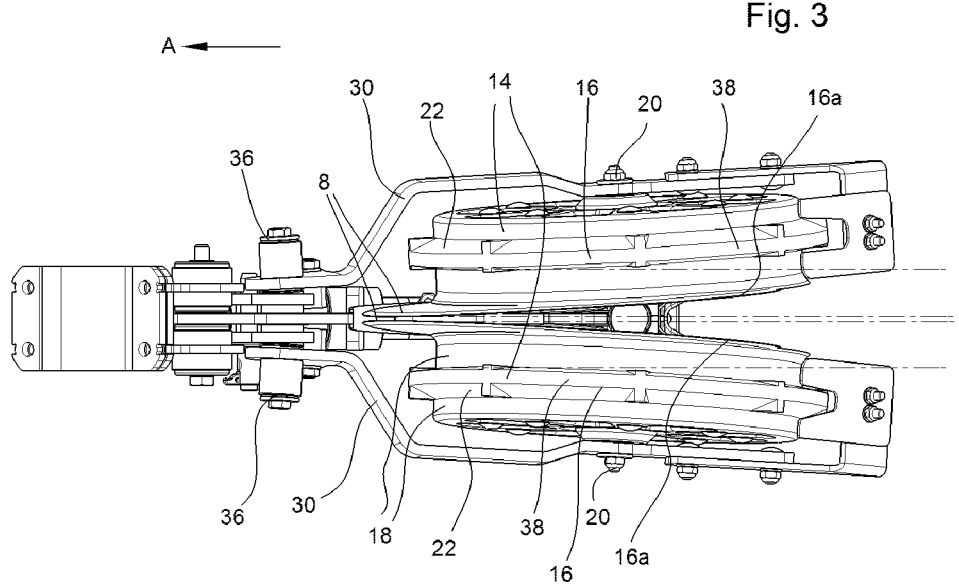

FIG. 3 shows the fertiliser coulter 8 from a perspective from below. In this view it is readily noticeable how, next to the ground contact areas 18, additional rings 16 are formed on the wheels 14, which project over the ground contact areas 18 in the radial direction. The double discs of the fertiliser coulter 8 are also readily noticeable. The two wheels 14 are each held by the pivot arms 30 in a position set obliquely to the horizontal, so that they face one another in the ground region and open upwards in the shape of a V. In addition a sweep of the double discs of the fertiliser coulter 8 and of the wheels 14 in the working direction A is noticeable.

The oblique position of the wheels 14 results from the fact that both the axes of rotation 20 to the horizontal as well as the axes of rotation 36 relative to the transverse direction are set at an angle to the working direction A. This produces the sweep of the wheels 14 in the working direction A, wherein the wheels 14 with their rings 16 additionally cut into the ground in a V-shaped manner.

In the view shown in FIG. 3 it is noticeable that the cross-sectional shape of the rings 16 is configured asymmetrically. While the inner flanks of the rings 16 facing the fertiliser coulter 8 have a surface that is orientated approximately perpendicularly, the flank of the rings 16 facing to the outside, which forms the wiping surface 22, is designed running obliquely to the vertical. By way of the wiping surfaces 22, ground material, which the rings 16 encounter, can be discharged to the side.

In addition, the rings 16 have an annular surface 38 facing to the outside on the circumferential side, with which an areal pressure can be exerted on the ground material located below. The annular surfaces 38 serve the purpose of re-compacting the ground material laterally of the fertiliser coulter 8 while rolling over. In addition, the flanks of the seed furrow, which is pre-formed by the rings 16, is finish-formed and compacted by the wiping surfaces 22. The edges of the seed furrow, which is pre-formed by the two rings 16, are indicated by dashed lines.

Between the edges of the seed furrow, which are indicated by the dashed lines, the edges of the fertiliser furrow are drawn in dash-dotted lines, in which the fertiliser coulter 8 places the fertiliser. In the view from below it is noticeable that the wheels 14 not only possess the larger rings 16 but additionally smaller rings 16a which are formed on the side of the wheels 14 facing the double discs of the fertiliser coulter 8. These additional rings 16a serve the purpose of pushing ground material over the fertiliser introduced into the ground and compact this ground material so that the following seeds can be readily placed on top.

Figure 4:
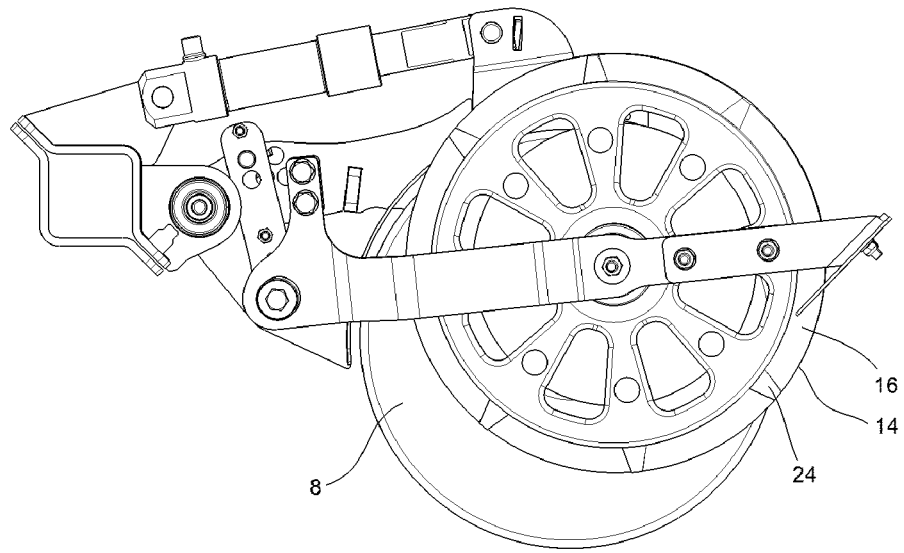

In FIG. 4, the fertiliser coulter 8 shown in FIG. 2 is shown with a wheel 14 which in the flank region comprises spokes and in which in the region of the ring 16 projections 24 are formed.

Figure 5:
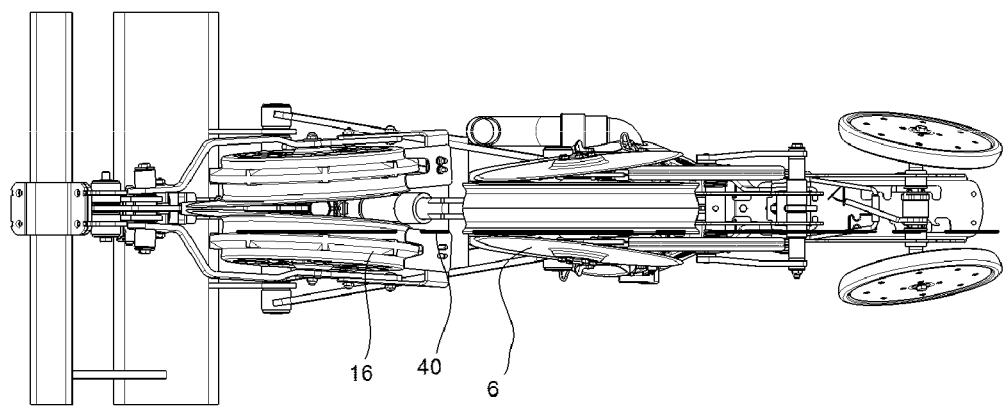

In FIG. 5, a view from below of a combination of a fertiliser coulter 8 with a seeding coulter 4 is shown. In this view it is noticeable that the inner flanks of the rings 16 are arranged on the wheels 14 in the region of the edges reaching deepest into the ground in a line 40 to the edges of the discs of the seeding coulter 6, which reach deepest into the ground. The line 40 runs parallel to the working direction A of the seed drill 2. The line 40 in the exemplary embodiment also marks the edge of the seed furrow into which the seeding coulter 6 has placed the seeds. In the view in FIG. 5 it is additionally readily noticeable that the setting angle of the double discs of the fertiliser coulters 8 and of the seeding coulter 6 correspond in a direction transversely to the working direction A and also to the perpendicular. This applies also to the setting angle at which the wheels 14 are set compared with the double discs of the seeding coulter 6.

The FIGS. 6 and 7 show combinations of fertiliser coulters 8 and seeding coulters 6 which can be arranged on a frame 4. In this exemplary embodiment, two seeding coulters 6 are assigned to a fertiliser coulter 8, which with a lateral offset to the working direction A, place the seeds on the ground. While a fertiliser coulter 8 forms a large seed furrow, the two downstream seeding coulters 6 assigned to this fertiliser coulter 8 each form their own seed furrow into which they then place the seeds. Because of this, the seeds are not placed exactly onto the fertiliser introduced into the ground by the fertiliser coulter 8. In particular from FIG. 7, which shows the fertiliser coulters 8 and the seeding coulters 6 from a view from below it is noticeable that both the fertiliser coulters 8 and also the seeding coulters 6 can be arranged in the longitudinal direction offset relative to one another in the working direction A. The seeds placed by the seeding coulters can in turn be placed offset in the working direction A relative to one another, so that a kind of zigzag pattern materialises in the seed placement. It is obvious that on a seed drill 2 multiple fertiliser coulters 8 and multiple seeding coulters 6 can be arranged in the transverse direction next to one another and/or also offset to one another in the longitudinal direction. Thus it is possible at present in one pass of a seed drill 2 to rip up to 48 seed furrows with fertiliser and seeding coulters suitably arranged next to one another and/or offset relative to one another into the ground and placing the seeds therein.

The invention is not restricted to the above exemplary embodiments. The person skilled in the art does not have any difficulties modifying the exemplary embodiments in a manner that said person deems suitable for adaptation to a specific application case.

The invention claimed is:

1. A seed drill, comprising:
   a frame to which a seeding coulter and a disc-shaped fertiliser coulter are connected the fertiliser coulter having a first enveloping surface arranged upstream of the seeding coulter in a working direction (A); and
   a depth control means, assigned to each of the seeding coulter and the fertiliser coulter, includes at least one wheel; and
   wherein the depth control means, on at least a side of the fertiliser coulter, is arranged laterally next to the fertiliser coulter so that seen from a direction transversely to the working direction (A) at least half of a second enveloping surface of the depth control means overlaps the first enveloping surface of the fertiliser coulter, and in that the at least one wheel comprises a row pre-forming and re-compacting means entering a ground, which, seen transversely to the working direction (A), is arranged relative to the fertiliser coulter so that the seeding coulter cuts into the ground and forms a seed furrow in a track of the at least one wheel.

2. The seed drill according to claim 1, wherein the depth control means is arranged on both sides of the fertiliser coulter.

3. The seed drill according to claim 1, wherein the at least one wheel is a spoke wheel or solid wheel.

4. The seed drill according to claim 3, wherein the row pre-forming and re-compaction means includes a circumferential ring, on an outer circumference of the at least one wheel, which projects towards an outside relative to a circumferential ground contact area of the at least one wheel.

5. The seed drill according to claim 3, wherein an axis of rotation of the at least one wheel is set obliquely to the working direction (A) so that in the working direction (A) a sweep of the at least one wheel materialises.

6. The seed drill according to claim 5, wherein a setting angle of the at least one wheel relative to the working direction (A) corresponds to a setting angle at which a double discs of the seeding coulter are set relative to the working direction (A).

7. The seed drill according to claim 5, wherein the axis of rotation of the at least one wheel is set obliquely to a vertical direction, wherein a setting angle of the at least one wheel in the vertical direction corresponds to the setting angle at which the double discs of the seeding coulter are set relative to the vertical direction.

8. The seed drill according to claim 1, wherein a wiping surface is assigned to the fertiliser coulter, the wiping surface being in a ground contact region on at least one of flank sides of the ground contact region that is set obliquely to a forward travelling direction.

9. The seed drill according to claim 1, wherein the depth control means has projections in a ground contact region which project over surrounding surfaces.

10. The seed drill according to claim 1, wherein the depth control means is asymmetrical.

11. The seed drill according to claim 1, wherein flanks of the depth control means, facing the fertiliser coulter, include at least one edge projecting deepest into the ground in a working position of the flanks, and at least one of edge of the seeding coulter, reaching deepest into the ground, is arranged in a line which runs parallel to the working direction (A).

12. The seed drill according to claim 1, wherein the depth control means is one of wholly and partially produced from a polymer or elastomer material.

13. The seed drill according to claim 1, wherein the depth control means is one of alone pivot-moveably mounted relative to the frame and jointly with the fertiliser coulter pivot-moveably mounted relative to the frame.

14. The seed drill according to claim 13, wherein pivot movements of the depth control means are restricted at least one of upwards and downwards by a mechanical stop.

15. The seed drill according to claim 14, wherein the mechanical stop is designed so as to be adjustable in height.

16. The seed drill according to claim 1, wherein the depth control means in a working position is held on the ground via an energy store.

17. The seed drill according to claim 16, wherein forces from the energy store acting on the depth control means are adjustable by means of an adjusting device.

18. The seed drill according to claim 17, wherein the adjusting device comprises an evaluation electronic system which is connected to a sensor system, the evaluation electronic system:
  measuring at least one of current height positions of the fertiliser coulter and forces acting on the fertiliser coulter;
  determining by means of software correcting variables from transmitted sensor data for adjusting the adjusting device; and
  transmitting determined actuating quantities as controlling quantities to actuators of the adjusting device.

19. The seed drill according to claim 1, wherein the seeding coulter connected to the depth control means is held in a working position on the ground via first and second energy stores, and the first energy store holding the seeding coulter on the ground is connected to the second energy store which holds the fertiliser coulter on the ground.

20. The seed drill according to claim 19, wherein the energy store is jointly adjustable for the fertiliser coulter and the seeding coulter.

21. The seed drill according to claim 16, wherein at least one of the fertiliser coulter and the seeding coulter are liftable by first and second energy stores.

22. The seed drill according to claim 16, wherein the energy store retracts the seed drill and at least one of the fertiliser coulters and seeding coulters, from transport positions thereof.

* * * * *